O. C. RITZ-WOLLER.
GASOLENE GAGE AND FILLING SPOUT.
APPLICATION FILED APR. 24, 1917.
1,335,196.
Patented Mar. 30, 1920.
2 SHEETS—SHEET 1.
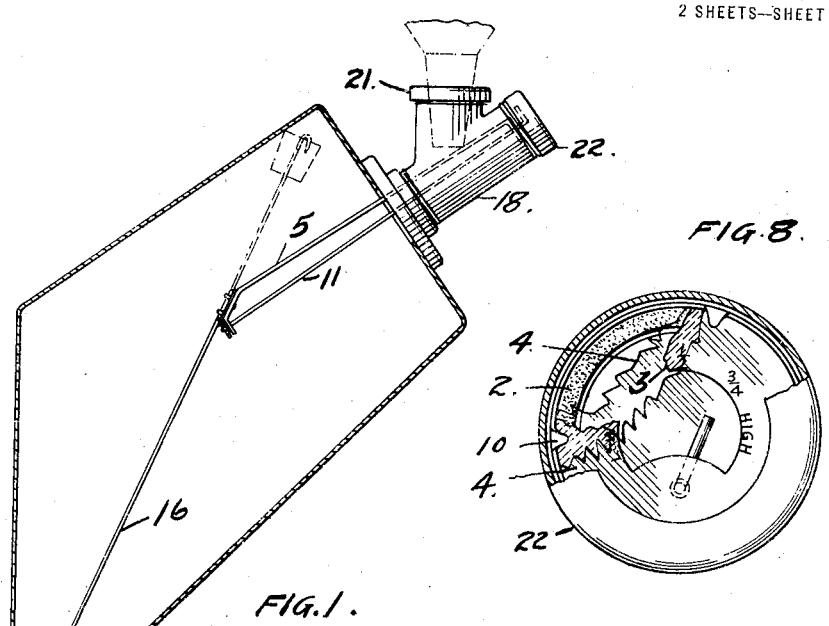
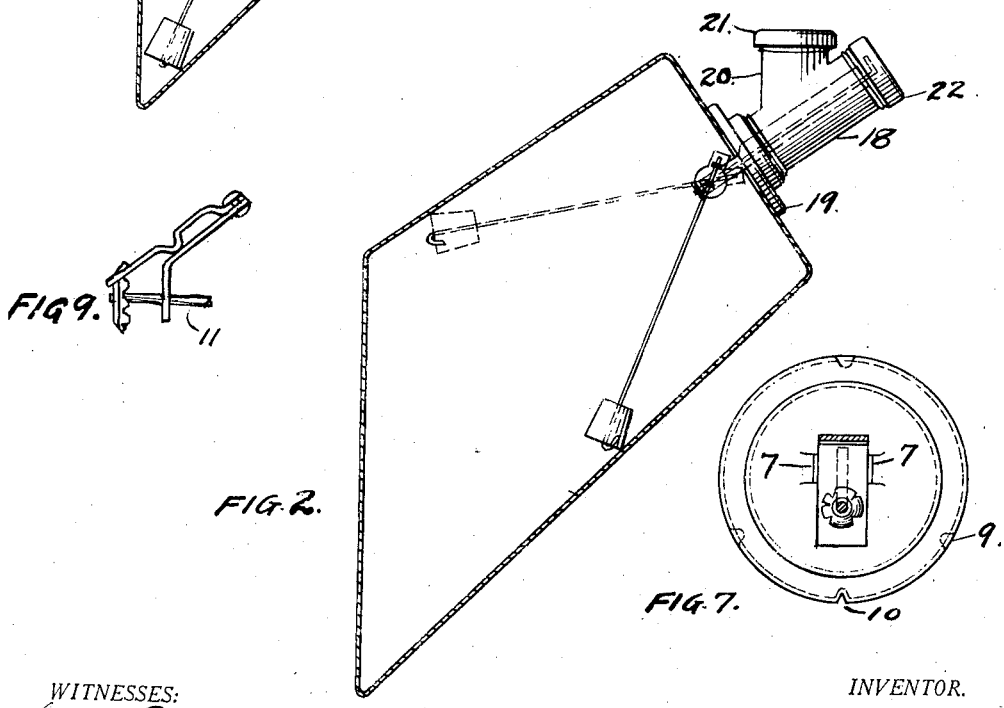
WITNESSES:
INVENTOR.
OLIVER C. RITZ-WOLLER.
BY
Daniel Brennan.
ATTORNEY.

O. C. RITZ-WOLLER.
GASOLENE GAGE AND FILLING SPOUT.
APPLICATION FILED APR. 24, 1917.
1,335,196. Patented Mar. 30, 1920.
2 SHEETS—SHEET 2.
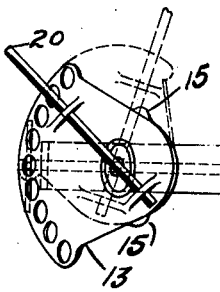
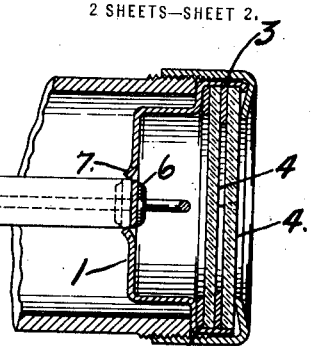
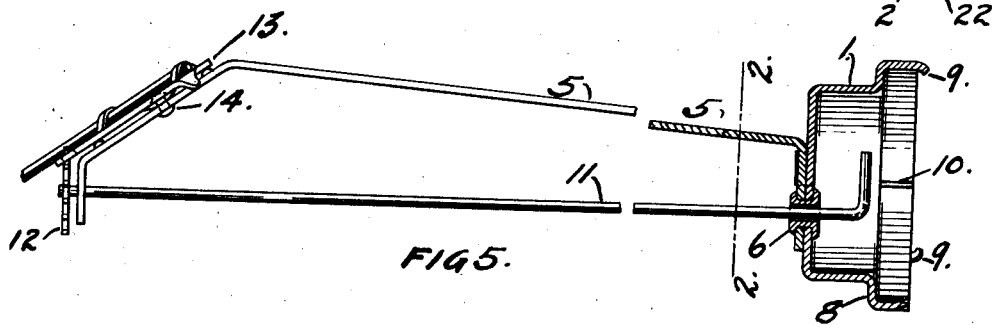
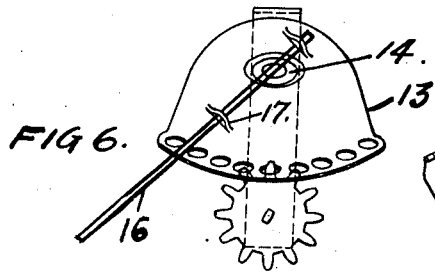
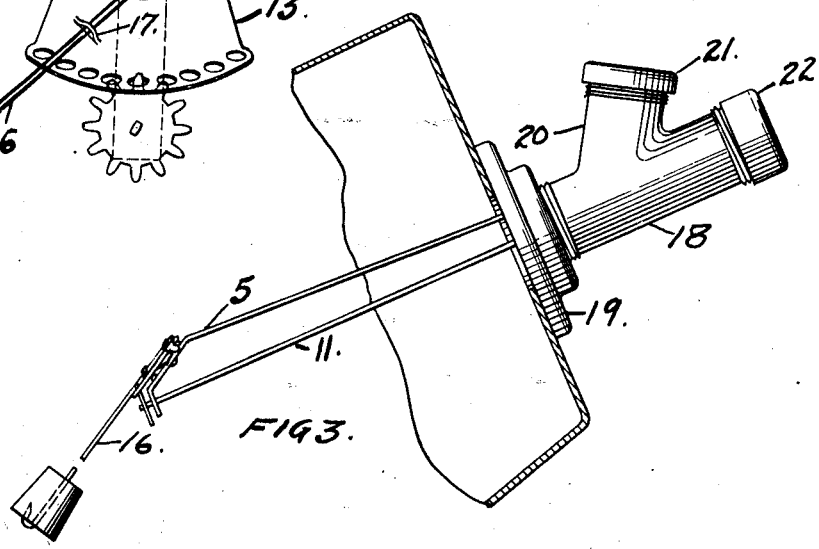
WITNESSES:
Philip K. Borman
A. M. Rasmussen
INVENTOR.
OLIVER C. RITZ-WOLLER
BY
Daniel A Brennan
ATTORNEY.

UNITED STATES PATENT OFFICE.

OLIVER C. RITZ-WOLLER, OF CHICAGO, ILLINOIS.

GASOLENE-GAGE AND FILLING-SPOUT.

1,335,196.

Specification of Letters Patent. Patented Mar. 30, 1920.

Application filed April 24, 1917. Serial No. 164,165.

*To all whom it may concern:*

Be it known that I, OLIVER C. RITZ-WOLLER, a citizen of the United States, residing at Chicago, in the county of Cook and State of Illinois, have invented certain new and useful Improvements in Combination Gasolene-Gages and Filling-Spouts, of which the following is a specification and in which like reference characters represent like parts wherever they appear.

My invention relates to liquid-level indicators for gasolene tanks and other closed vessels.

An object of my invention, is to so construct a gage that its float actuating mechanism will permit the float to reach the highest and lowest parts of an irregular shaped float container; so as to accurately register the amount of liquid contained in the tank at all levels, and to enable it to be withdrawn from the filling-spout without disassembling; also, so as to have its pinion and perforated plate construction eliminate the necessity of providing a thrust-bearing.

Another object of the invention is to so construct a gage, in combination with the filling-spout, as to eliminate the necessity of removing any part of the gage while supplying liquid to the container.

In the drawings:

Figure 1, is a side-assembly view of the device embodying the present invention, showing an irregular tank in section, having a filling-spout mounted thereon; also filling-funnel and upper position of the float in dotted lines; lower position of the float in full lines.

Fig. 2, is a like section, disclosing a gage construction known to the art, but having the filling-spout of the present invention shown thereon.

Fig. 3, is a fragmental sectional view of the tank, showing the filling-spout and position of the gage mechanism that lies within the tank, the float stem being partly broken away.

Fig. 4, shows an enlarged partial sectional and partial plan view of the gage, having the float and part of the float stem omitted, showing also an extreme position of the perforated plate and float stem in dotted lines.

Fig. 5, is a partial side-elevation and sectional view of the gage, having the filling-spout, cap, transparent disks, dial, cork ring, float, and part of the float stem omitted.

Fig. 6, is an end elevation of actuating mechanism, the float being removed.

Fig. 7, is a sectional view taken on line 2—2 of Fig. 5.

Fig. 8, is a partial plan and partial sectional view showing the cap, ring, transparent disks, dial, and indicating pointer.

Fig. 9, is a fragmental view showing how the teeth of pinion are bent to interlock with perforations in plate.

Casing 1, containing resilient ring, 2, dial, 3, transparent disks, 4, is secured to bent arm 5, by means of hollow rivets 6. The lugs, 7, (Figs. 4 and 7) provided on the bottom wall of the casing, prevent the tendency of arm, 5, to rotate.

The annular shoulder 8, is formed by enlarging the upper part of the casing.

The dial, ring, and disks, are held securely against the annular shoulder, by bending ears 9, downward.

The side wall of the casing has a projection, as at 10 (Figs. 5 and 7) to match a notch in the dial for locating and preventing rotation.

The bent arm, 5, is formed by bending the extreme apertured ends of a flat member, until said ends are parallel with each other and the apertures are in alinement.

A rod, or spindle, 11, extends through one of the apertured ends of said bar, thence into the casing through hollow rivet, 6, that secures one of the apertured ends of bent arm, 5, to the lower wall of casing.

The end within the casing is bent at right angles to the other part of the spindle, and forms an indicating pointer.

At the other end of the spindle, and beyond the opposite apertured end of bent arm, 5, a pinion, 12, is securely fastened so that the teeth of said pinion will mesh with the perforations in plate 13, rotatively mounted on the belt arm, 5.

Said perforations in plate are so spaced with relation to each other and to the pivot point, 14, as to be actuated by the pinion exactly like the ordinary segmental gear.

Lips, 15, are provided to limit the throw of plate 13, thereby limiting the throw of the float, which is connected to said plate, by the float stem, 16, being inserted under the straps, 17.

Ordinarily, a shoulder, or set collar, is provided on the spindle to take up the thrust, but my arrangement of having the teeth of the pinion extend through the perforations of a plate, provides an arrangement that performs the function of a segmental gear, and at the same time acts as its own thrust-bearing.

A preferred embodiment of the filling-spout is shown in Fig. 3, comprising a Y shaped hollow casing, 18, and having an internally threaded flanged base 19, to receive the exteriorly threaded end of casing 18.

The branch 20, is utilized to receive a funnel for supplying the tank with liquid and its upper end is exteriorly threaded to receive the internally threaded closing cap, 21. The other branch is utilized to receive a gage, its end being externally threaded to receive the internally threaded closing cap 22.

Said cap has a central opening in its upper face, so as to make the indicating pointer and dial visible, and is utilized to hold the gage in place.

I claim:

1. In a gasolene gage in combination with a two-way filling-spout, an arm, having angularly disposed apertured ends extending therefrom in the same direction; a casing secured to one end, a dial in said casing, a rod, extending rotatively through both apertured ends and forming an indicating pointer below said dial; a perforated segment oscillatively mounted on said arm, and interlocked coöperative connections between said perforated segment and rod, whereby oscillation of said perforated segment imparts a rotative movement to the rod, and a float member connected to said segment.

2. In a gasolene gage in combination with a two-way filling-spout, an arm, having angularly disposed apertured ends extending therefrom in the same direction; a casing secured to one end, a dial in said casing, a rod extending through both apertured ends and forming an indicating pointer below said dial, said dial having an opening therein, through which said indicator is visible; a perforated segment oscillatively mounted on said arm; an interlocking perforation and tooth connection between said perforated segment and rod, and a float member connected to said perforated segment.

3. In a gasolene gage in combination with a two-way filling-spout, a one piece arm, formed with angularly disposed apertured ends extending therefrom in the same direction; a casing secured to one end, a dial in said casing, a rod extending rotatively through both apertured ends, and forming an indicating pointer below the dial; said dial having an opening therein, through which said indicator is visible; a perforated segment, oscillatively mounted on said arm; an interlocking perforation and tooth connection between said perforated segment and rod; whereby movement of the said perforated segment imparts a rotating movement to the rod, and a float member connected to said perforated segment and controlling the movement thereof.

OLIVER C. RITZ-WOLLER.